(12) United States Patent
Song et al.

(10) Patent No.: US 7,805,754 B2
(45) Date of Patent: Sep. 28, 2010

(54) COMMUNICATION METHOD AND APPARATUS USING IP ADDRESS OF VPN GATEWAY FOR MOBILE NODE IN A VPN

(75) Inventors: O-Sok Song, Seoul (KR); Sung-Ho Choi, Suwon-si (KR); Eun-Hui Bae, Seoul (KR); Chong-Ho Choi, Seoul (KR); Young-Jip Kim, Seoul (KR); Dong-Young Kim, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1335 days.

(21) Appl. No.: 11/272,475

(22) Filed: Nov. 14, 2005

(65) Prior Publication Data

US 2006/0104252 A1 May 18, 2006

(30) Foreign Application Priority Data

Nov. 12, 2004 (KR) .................. 10-2004-0092415

(51) Int. Cl.
*H04L 29/06* (2006.01)
(52) U.S. Cl. ................ 726/4; 726/15; 726/12; 709/223; 709/224; 709/225
(58) Field of Classification Search ........... None
See application file for complete search history.

(56) References Cited

U.S. PATENT DOCUMENTS

| | | | |
|---|---|---|---|
| 6,954,790 B2 * | 10/2005 | Forslow | 709/227 |
| 7,477,626 B2 * | 1/2009 | Chen et al. | 370/331 |
| 2002/0018456 A1 | 2/2002 | Kakemizu | |
| 2004/0037260 A1 | 2/2004 | Kakemizu | |
| 2005/0041808 A1 * | 2/2005 | He | 380/248 |

FOREIGN PATENT DOCUMENTS

WO WO 02-42861 5/2002

OTHER PUBLICATIONS

Faccin M S et al: "Diameter Mobile IPv6 Application, draft-le-aaa-diameter-mobileipv6-03.tx" IETF Standard-Working-Draft, Internet Engineering Task Force, IETF, CH, Apr. 2003, pp. 1-32.

(Continued)

*Primary Examiner*—Pramila Parthasarathy
(74) *Attorney, Agent, or Firm*—Roylance, Abrams, Berdo & Goodman, L.L.P.

(57) ABSTRACT

A communication method and apparatus using the IP address of a gateway for an MN in a VPN are provided. When the MN is to access the VPN, the gateway acting an FA in the VPN performs a Mobile IP registration on behalf of the MN and is allocated a HoA for the MN from an HA. Therefore, the number of addresses required for the Mobile IP registration of the MN is reduced and overlap between an IP-in-IP tunnel for Mobile Internet and an IPsec tunnel for the VPN is avoided. As a result, packet transmission overhead is reduced.

57 Claims, 9 Drawing Sheets

OTHER PUBLICATIONS

Ohnishi H et al: "Mobile IPv6 VPN using Gateway Home Agent," IETF Standard-Working-Draft, Internet Engineering Task Force, IETF, CH, Jun. 2002, pp. 1-18.

McCann P J et al: "An Internet Infrastructure for Cellular CDMA Networks Using Mobile IP" IEEE Personal Communications, IEEE Communications Society, US, vol. 7, No. 4, Aug. 2000, pp. 26-32.

Tsuda Y et al: "Design and Implementation of Network CryptoGate-IP-layer Security and Mobility support;" Proceedings of the Thirty-First Hawaii International Conference on System Sciences IEEE Comput. Soc, US. vol. 7, Jan. 6, 1998, pp. 681-690.

Perkins, C E et al: "AAA Registration Keys for Mobile IPv4" IETF Standard-Working-Draft, Internet Engineering Task Force, IETF, CH, vol. mip4, No. 6, Jun. 1, 2004.

* cited by examiner

COMMUNICATION METHOD AND APPARATUS USING IP ADDRESS OF VPN GATEWAY FOR MOBILE NODE IN A VPN

PRIORITY

This application claims the benefit under 35 U.S.C. §119 of a Korean Patent Application entitled Serial No. 2004-92415 filed in the Korean Intellectual Property Office on Nov. 12, 2004, the entire disclosure of which is incorporated by reference.

BACKGROUND OF THE INVENTION

1. Field of the Invention

The present invention relates generally to wireless Internet. In particular, the present invention relates to a method and apparatus for enabling a Mobile Node (MN) to access a Virtual Private Network (VPN) using a Mobile Internet Protocol (IP) address.

2. Description of the Related Art

Conventional Internet to which hosts fixed to a wired network are connected has recently evolved to support MNs roaming between networks in the environment where a wired network interworks with a wireless network. A protocol developed to support the mobility of the MNs over the Internet is Mobile IP. The Mobile IP enables an MN to continue communications with a Correspondent Node (CN) even though it changes its Access Point (AP) of attachment to the Internet.

For mobile Internet services, a mobile communication network is configured to include a Home Agent (HA) residing within the home network of an MN, for receiving a packet instead of the MN and delivering the packet to a foreign network where the MN is now located, and a Foreign Agent (FA) for receiving the packet from the HA to the MN in the foreign network.

The MN has a unique local IP address identifying the MN in the home network, Home of Address (HoA). As the MB moves out of the home network and connects to the foreign network, it acquires a forwarding IP address by which the home network forwards a packet to the foreign network, Care of Address (CoA) and notifies the HA of the CoA. This procedure is called registration. When the MN registers the CoA, the HA supports the mobility of the MN by Binding Updates. After it detects that it is outside the home network, the MN sends the CoA to the HA using a Security Association (SA) established between the MN and the HA.

Generation and integration of network environments evolved in diverse manners add security risks to an integrated network as well as the existing wired environment. One of required service scenarios is MNs' connection to a VPN. In this scenario, an MN must be allowed to continue communications, while roaming within the internal network of the VPN or moving to an external network. For this purpose, a VPN technology interworks with a Mobile IP technology.

To access the VPN in a foreign network, the MN performs a Mobile IP registration for continuous communications over the VPN. The MN first establishes an IPsec tunnel with a VPN gateway using a local IP address allocated by the foreign network, and then performs a Mobile IP registration within the VPN using an IP address used in the IPsec tunnel, Co-located CoA (Co-CoA).

In the IPsec tunnel establishing procedure with the VPN gateway, the VPN gateway or another VPN node, for example, a Dynamic Host Configuration Protocol (DHCP) server allocates an IP address (i.e. Co-CoA) to be used in the VPN to the MN. Upon receipt of an agent advertisement message from the VPN gateway after establishing the IPsec tunnel with the VPN gateway, the MN registers the Co-CoA to the HA. The MN is dynamically allocated a HoA from the HA during the Mobile IP registration and then is able to communicate with another MN within the VPN using the HoA.

As described above, the conventional VPN-Mobile IP interworking technology supports the mobility of the MN using the Mobile IP within the VPN. However, a distinctive shortcoming with this interworking technology is that three IP addresses are required for each MN, that is, a local IP address used in the foreign network, the Co-CoA used to create the IPsec tunnel between the MN and the VPN gateway, and the HoA of the MN. In addition, since a packet passing through the IPsec tunnel is encapsulated in a Mobile IP tunneling header, packet transmission overhead is large between the MN and the VPN gateway.

SUMMARY OF THE INVENTION

An object of the present invention is to address at least the above problems and/or disadvantages and to provide at least the advantages described below. Accordingly, an object of the present invention is to provide a method and apparatus for allowing an MN to use an FA-CoA instead of a Co-CoA when using Mobile IP in a VPN.

Another object of the present invention is to provide a method and apparatus for preventing overlap between an IPsec tunnel configured for a VPN and an IP-in-IP tunnel configured for Mobile IP, when using Mobile IP in the VPN.

The above exemplary objects are achieved by providing a communication method and apparatus using the IP address of a gateway for an MN in a VPN.

According to an exemplary aspect of the present invention, in a method of allocating a HoA to an MN in a VPN, the MN transmits to a gateway of the VPN an authentication request message requesting allocation of a HoA. The gateway acquires the HoA allocated from a HA which manages the MN on behalf of the MN and transmits an authentication response message comprising the allocated HoA to the MN. The MN communicates with a CN using the HoA through the gateway.

According to another exemplary aspect of the present invention, in an apparatus for allocating a HoA to an MN in a VPN, an HA and an FA are located in the VPN. A gateway receives an authentication request message requesting allocation of a HoA for use in the VPN from the MN which intends to access the VPN, acquires the HoA allocated from the HA on behalf of the MN, and transmits an authentication response message comprising the allocated HoA to the MN, so that the MN communicates with a CN using the HoA.

According to another exemplary aspect of the present invention when allocating a HoA in an MN in a VPN, the MN transmits to a gateway of the VPN an authentication request message requesting allocation of a HoA. The MN receives from the gateway an authentication response message comprising a HoA allocated for the MN by an HA which manages the MN. The MN communicates with a CN using the HoA through the gateway.

According to yet another exemplary aspect of the present invention, when allocating a HoA for an MN in a gateway of a VPN, the gateway receives from the MN an authentication request message requesting allocation of a HoA. The gateway acquires the HoA for use in the VPN from an HA which manages the MN on behalf of the MN. The gateway transmits an authentication response message including the allocated HoA to the MN and relays communications between the MN and a CN using the HoA.

BRIEF DESCRIPTION OF THE DRAWINGS

The above and other exemplary objects, features and advantages of the present invention will become more apparent from the following detailed description of the exemplary embodiments of the present invention when taken in conjunction with the accompanying drawings in which like reference numerals will be understood to refer to like parts, components and structures, where.

DETAILED DESCRIPTION OF EXEMPLARY EMBODIMENTS

Certain exemplary embodiments of the present invention will be described herein below with reference to the accompanying drawings. In the following description, well-known functions or constructions are omitted for clarity and conciseness.

On of the exemplary feature of the present invention as described below is that an MN uses a Foreign Agent-Care of Address (FA-CoA) instead of a Co-CoA in Mobile IP registration to an HA. The FA-CoA refers to the IP address of a VPN gateway. For this purpose, the MN uses a HoA as its IP address within an IPsec tunnel that the MN has established with the VPN gateway. However, the MN is not allocated the HoA through the Mobile IP registration until the IPsec tunnel is created. In this context, during creation of the IPsec tunnel, the VPN gateway performs the Mobile IP registration on behalf of the MN and acquires the HoA of the MN from the HA of the MN in accordance with an exemplary implementation of an embodiment of the present invention.

The configuration and operation of a network according to an exemplary embodiment of the present invention will be described with reference to FIG. 1.

Figure 1:
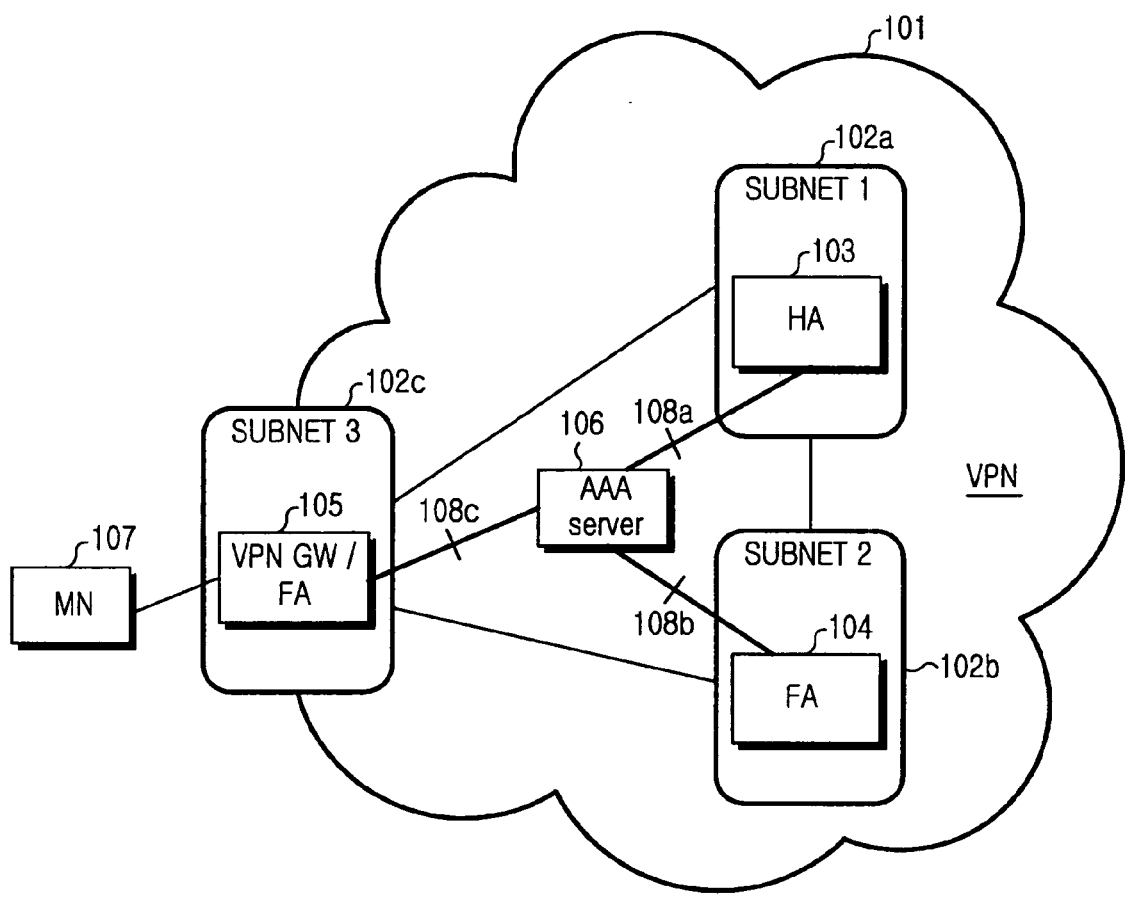
FIG. 1 illustrates the configuration of a VPN according to an exemplary embodiment of the present invention.

Referring to FIG. 1, a VPN 101 is comprised of a plurality of subnets 102a and 102b in an intranet and a subnet 102c for an MN 107 in an eternal network (not shown), for example, a Wireless Local Area Network (WLAN). A VPN gateway (GW) 105 resides in the subnet 102c as a component of the VPN 101. The subnets 102a, 102b and 102c serve as a home network and a foreign network, separately. An HA 103 is located in the home network and an FA 104 is located in the foreign network. The subnet 102c is a foreign network all the time in Mobile IP and the VPN GW 105 acts as an FA.

The VPN 101 further includes an Authentication, Authorization and Accounting (AAA) server 104 for using Mobile IP in the VPN 101. Security channels 108a, 108b and 108c are established between the AAA server 106 and the HA 103, between the AAA server 106 and the FA 104, and between the AAA server 106 and the VPN GW 105. The AAA server 106 authenticates nodes that intend to access the VPN 101. It also authenticates a Mobile IP registration request including a Mobile-AAA Authentication extension, and generates a Random Number (RAND) and a shared secret key required to generate a Mobility Security Association (MSA).

The MN 107 is dynamically allocated a HoA as an IP address for use in the VPN 101. When initially accessing the VPN 101 from the home network in the intranet, the MN 107 is allocated an IP address from the HA 103 or a DHCP server (not shown). In the case where the MN 107 initially accesses the VPN 101 from a foreign network in the intranet, it is allocated an IP address by dynamic address allocation of Mobile IP.

If the MN 107 initially accesses the VPN 101 outside the intranet, it can be allocated an IP address to be used as a HoA from the HA 103 via the VPN GW 105 during creating an IPsec tunnel with the VPN GW 105. When the MN 107 is outside the intranet, the VPN GW 105 performs a Mobile IP registration on behalf of the MN 107 using an FA-CoA. The FA-CoA is the IP address of the VPN GW 105. In this way, the MN 107 is not allocates an additional IP address from the external network, when it is in the external network. Therefore, unnecessary use of an IP address is avoided.

As stated above, when creating the IPsec tunnel between the MN 107 and the VPN GW 105, the VPN GW 105 performs a Mobile IP registration on behalf of the MN 107, is dynamically allocated an IP address as a HoA for the MN 107 from the HA 103 and provides the HoA to the MN 107. Thus, the IPsec tunnel is completed. Since the VPN GW 105 performs the Mobile IP registration instead of the MN 107, it is called a VPN GW/MN proxy.

An MSA between the MN 107 and the HA 103 is used for authentication of a Mobile IP registration message. If the MSA does not exist between the MN 107 and the HA 103, the MSA is created during the Mobile IP registration. To do so, the Mobile IP registration request message transmitted to the AAA server 106 includes a Mobile-Home Key Generation Nonce Request extension and a Mobile-AAA Authentication extension.

To create the Mobile-AAA Authentication extension, an AAA SA set up between the MN 107 and the AAA server 106 is used. The AAA SA is comprised of a Security Parameter Index (SPI) identifying the AAA SA, an AAA-key being a shared secret key between two entities sharing the AAA SA, and other security parameters. To perform a Mobile IP registration on behalf of the MN 107, the VPN GW 105 must get knowledge of the contents of the AAA SA, especially the AAA-key and the SPI for generating the Mobile-AAA Authentication extension.

While typically, one or more AAA SAs exist between the MN 107 and the AAA server 106 in Mobile IP, the AAA SA is dynamically allocated in the following manner so that the VPN GW 105 can acquire the AAA-key and SPI of the AAA SA in accordance with an exemplary embodiment of the present invention.

In the procedure of accessing the VPN 101 by the MN 107 and authentication of the MN 107 by the AAA server 106, the AAA SA is dynamically created between the MN 107 and the AAA server 106. In the AAA SA, the AAA-key is set to a Master Session Key (MSK) generated during Extensible Authentication Protocol (EAP)-based authentication, and other security parameters are set to predetermined values. Especially the SPI of the AAA SA is set to a value known to the VPN GW 105.

Since the VPN GW 105 receives the MSK from the AAA server 106 during authenticating the MN 107 by the EAP in the AAA server 106, it eventually gets the AAA-key of the AAA SA. The VPN GW 105 performs the Mobile IP registration on behalf of the MN 107 using a Mobile-AAA Authentication extension created with the AAA key and the known SPI of the AAA SA.

The following description is an exemplary implementation where an Internet Key Exchange version 2 (IKEv2) is used in creating an IPsec tunnel and the EPA is used for mutual authentication of IKEv2.

Figure 2:
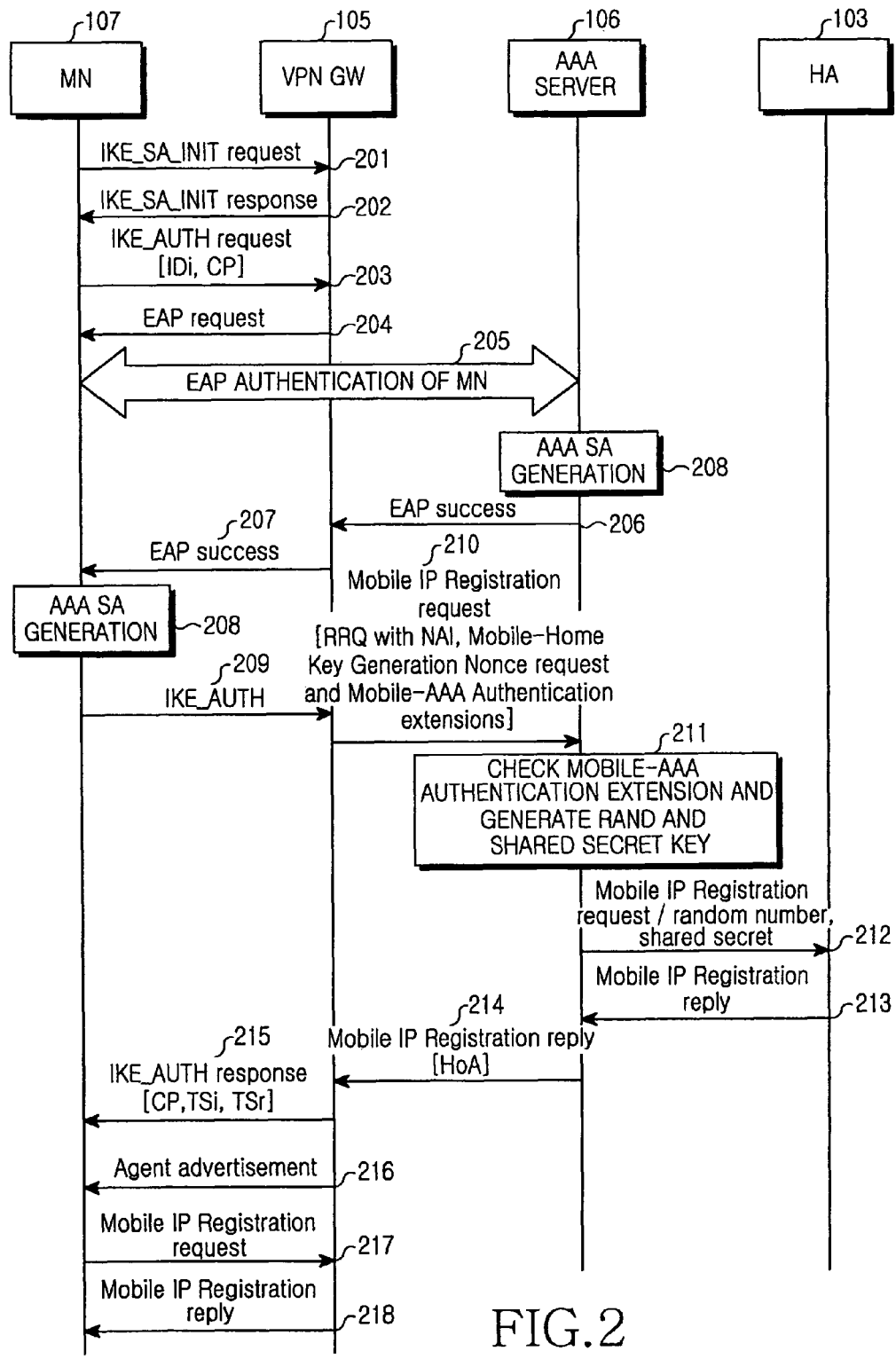
FIG. 2 is a diagram illustrating a signal flow for an MN's initial access to the VPN according to an exemplary embodiment of the present invention.

FIG. 2 is a diagram illustrating a signal flow for an MN's initial access to the VPN according to an exemplary embodiment of the present invention. In the illustrated case of FIG. 2, the MN 107 serves as an initiator for initializing an IKE and the VPN GW 105 serves as a responder.

Referring to FIG. 2, the MN 107 transmits an IKE_SA_INIT request message to the VPN GW 105 in step 201 and receives an IKE_SA_INIT response message from the VPN GW 105 in step 202, thereby negotiating an IKE SA with the VPN GW 105. In step 203, the MN 107 transmits an IKE_AUTH request message to the VPN GW 105.

By excluding AUTH payload from the IKE_AUTH request message, the MN 107 proposes EAP mutual authentication and simultaneously starts to negotiate the first Child SA with the VPN GW 105. An ID of Initiator (IDi) included in the IKE_AUTH request message is set to a Network Access Identifier (NAI) of the MN 107. The NAI, which may have a standard syntax defined by Request For Comments (RFC) 2486, is uniquely allocated to the MN 107.

The MN 107 also requests allocation of an IP address for use within the VPN 101 to the VPN GW 105 by including Configuration (CP) payload before SA payload in the IKE_AUTH request message. In the case where the MN 107 proceeds with the IKE with a security gateway like the VPN GW 105, the CP payload is included in the IKE_AUTH request message for the MN 107 to request an IP address to be used in the VPN 101 from the external network through the VPN GW 105. The CP payload is set to null in step 203.

When determining that the IKE_AUTH request message proposes EAP mutual authentication, the VPN GW 105 notifies the MN 107 of the start of EAP authentication by transmitting an EAP request message in step 204. In step 205, the AAA server 106 authenticates the MN 107 by routing of the VPN GW 105. If the authentication is successful, the AAA server 106 transmits an EAP success message to the VPN GW 105 to notify the MN 107 of the successful authentication in step 206. The VPN GW 105 forwards the EAP success message to the MN 107 in step 207. In step 208, the MN 107 and the AAA server 106 generate an AAA SA using an MSK generated during the authentication of step 205. If the AAA SA already exists, they update the AAA SA. The AAA SA generation in the AAA server 106 takes place before the transmission of the EAP success message in step 206.

In step 209, the MN 107 generates AUTH payload using the MSK and transmits an IKE_AUTH message including the AUTH payload to the VPN GW 105. Upon receipt of the IKE_AUTH message, the VPN GW 105 checks whether the MN 107 has requested allocation of an IP address by including the CP payload in the IKE_AUTH request message in step 203. If the MN 105 has not requested allocation of an IP address, the VPN GW 105 transmits an IKE_AUTH response message immediately to the MN 107, thus terminating the mutual authentication and the Child SA negotiation.

On the other hand, if the MN 107 has requested allocation of an IP address, the VPN GW 105 generates a Mobile IP Registration request message and transmits it to the AAA server 106 by an AAA protocol in order to perform a Mobile IP registration on behalf of the MN 107 in step 210. The Mobile IP Registration request message includes a NAI extension, a Mobile-Home Key Generation Nonce request extension, and a Mobile-AAA Authentication extension to request dynamical allocation of a HoA and generation of an MSA with the HA 103, that is, a Mobile-Home MSA. In the Mobile IP Registration request message, a HoA is set to 0.0.0.0 and a CoA is set to the IP address (i.e. FA-CoA) of the VPN GW 105. The NAI extension is created by the IDi of the IKE_AUTH request message received in step 203, and the Mobile-AAA Authentication extension is generated by an AAA-key generated in step 205, that is, the MSK and a known SPI. Procedures which may be used for generating the extensions are known to skilled artisans, and therefore, descriptions thereof are omitted for conciseness.

Upon receipt of the Mobile IP Registration request message from the VPN GW 105, the AAA server 106 authenticates the Mobile IP Registration request message by checking the Mobile-AAA Authentication extension included in the message in step 211. If the authentication is successful, the AAA server 106 selects a RAND and generates a shared secret key for a Mobile-Home MSA using the RAND. In step 212, the AAA server 106 transmits to the HA 103 of the MN 107 the Mobile IP Registration request message, the RAND, and the shared secret key by the AAA protocol.

The HA 103 dynamically allocates a HoA for the MN 107, generates a Mobile-Home MSA, and generates a Mobile IP Registration reply message including the HoA. In step 213, the HA 103 transmits the Mobile IP Registration reply message to the AAA server 106 by the AAA protocol. The AAA server 106 forwards the Mobile IP Registration reply message to the VPN GW 105 by the AAA protocol in step 214. The VPN GW 105 acquires the HoA of the MN 107 from the Mobile IP Registration reply message and keeps the Mobile IP Registration reply message for a predetermined period of time.

In step 215, the VPN GW 105 ends the mutual authentication and the Child SA negotiation by transmitting an IKE_AUTH response message to the MN 107. The IKE_AUTH response message includes the CP payload and the Traffic Selection payloads (TSs) of the initiator and the responder. The TSs (TSi and TSr) are used to identify packets that can pass through an IPsec tunnel. When the CP payload is used, the TSs are determined according to the CP payload. The VPN GW 105 notifies the MN 107 of an IP address to be used within the IPsec tunnel by setting the HoA in the CP payload of the IKE_AUTH response message.

After step 215, the MN 107 has been connected to the VPN 101. To support the mobility of the MN 107, the VPN GW 105 prompts the MN 107 to do a Mobile IP registration by transmitting an Agent advertisement message in step 216. In step 217, the MN 107 transmits a Mobile IP Registration request message to the VPN GW 105. The VPN GW 105 transmits the kept Mobile IP Registration reply message to the MN in step 219. Thus, the MN 107 generates the MSA with the HA 103 and has its HoA by which to communicate in the VPN 101.

Now a description will be made of the operations of the MN, the VPN GW, and the AAA server according to an exemplary embodiment of the present invention.

Figure 3:
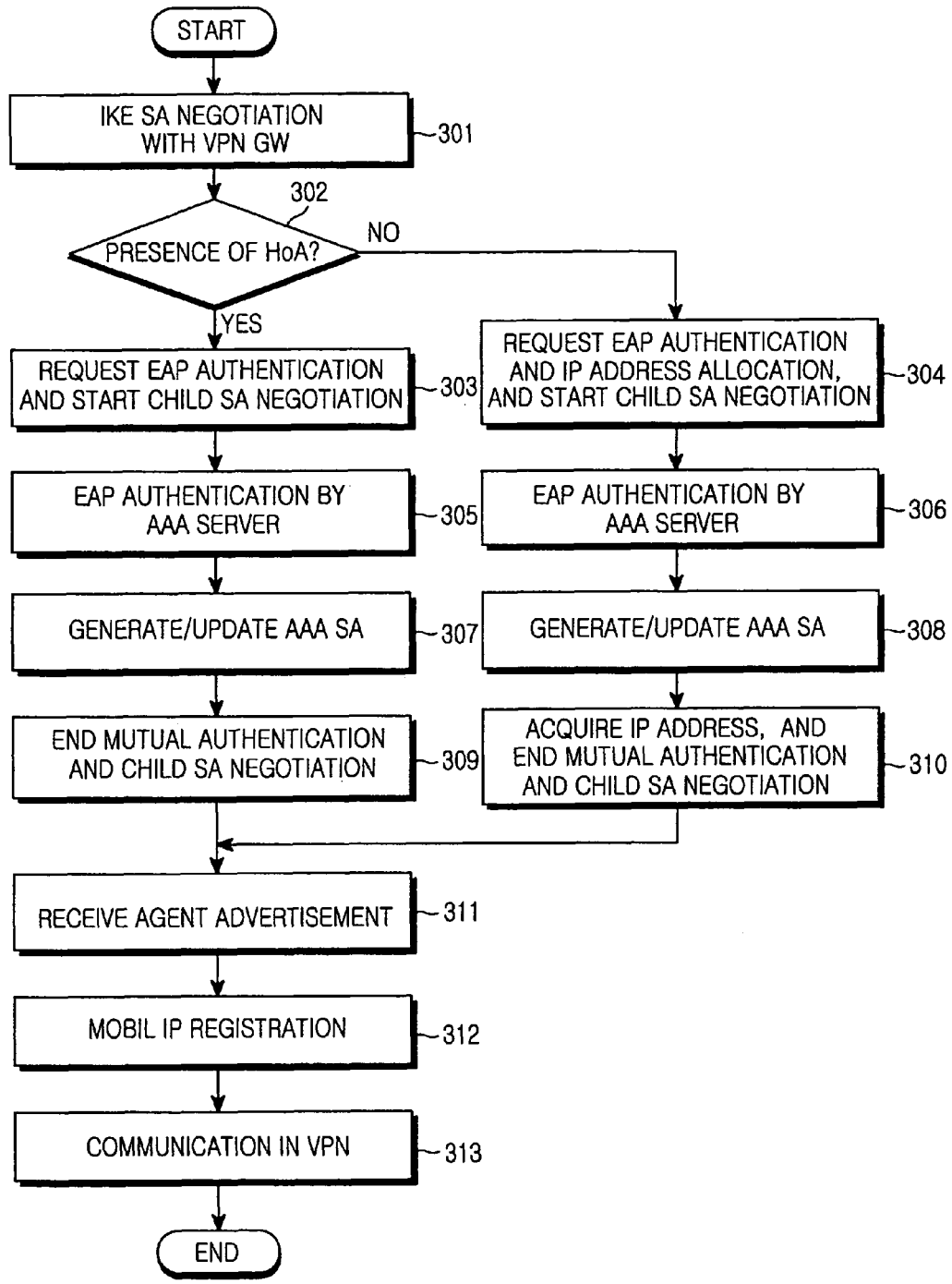
FIG. 3 is a flowchart illustrating the operation of an MN according to an exemplary embodiment of the present invention.

FIG. 3 is a flowchart illustrating the operation of the MN according to an exemplary embodiment of the present invention.

Referring to FIG. 3, step 301 is an early stage of generating an IPsec tunnel between the MN and the VPN GW. The MN transmits an IKE_SA_INIT request message to the VPN GW and receives an IKE_SA_INIT response message from the VPN GW, thus negotiating an IKE SA in step 301. In step 302, the MN determines whether it already has a HoA. At an initial access to the VPN, the MN does not have a HoA. By contrast, when the MN moves from the intranet to an external network or moves between external networks, the MN already has a HoA.

In the presence of a HoA, the MN starts a Child SA negotiation and proposes EAP mutual authentication by transmitting an IKE_AUTH request message without AUTH payload to the VPN GW in step 303. In the IKE_AUTH request message, an IDi contains the NAI of the MN. In step 305, the MN is EAP-authenticated by the AAA server. If the authentication is successful, the MN generates/updates an AAA SA between the MN and the AAA server using an MSK generated during the authentication in step 307. The MN transmits an IKE_AUTH message including AUTH payload created using the MSK to the VPN GW and receives an IKE_AUTH response message from the VPN GW, thus terminating the mutual authentication and the Child SA negotiation in step 309.

On the other hand, in the absence of a HoA in step 302, the MN simultaneously requests allocation of an IP address as a HoA within the IPsec tunnel, starts the Child SA negotiation, and proposes EAP mutual authentication to the VPN GW by transmitting an IKE_AUTH request message with CP payload but without AUTH payload in step 304. In step 306, the MN is EAP-authenticated by the AAA server. The MN generates/updates an AAA SA between the MN and the AAA server using an MSK generated during the authentication in step 308. The MN transmits an IKE_AUTH message including AUTH payload created using the MSK to the VPN GW and receives an IKE_AUTH response message from the VPN GW, thus acquiring the IP address for use within the IPsec tunnel and terminating the mutual authentication and the Child SA negotiation in step 310.

After step 309 or step 310, the MN is now able to communicate in the VPN. For support of the mobility of the MN in the VPN, the MN needs to perform a Mobile IP registration. Therefore, the MN receives an Agent advertisement message from the VPN GW in step 311 and transmits a Mobile IP Registration request message to the HA in step 312. For sending the Mobile IP Registration request message, the MN generates a Mobile-Home MSA using a Mobile IP NAI extension, a Mobile-Home Key Generation Nonce Request extension, and a Mobile-AAA Authentication extension. The Mobile-AAA Authentication extension is generated using the AAA SA created in step 307 or step 308. Upon receipt of a Mobile IP Registration reply message, the MN can use the VPN, with it mobility supported in step 313.

Figure 4:
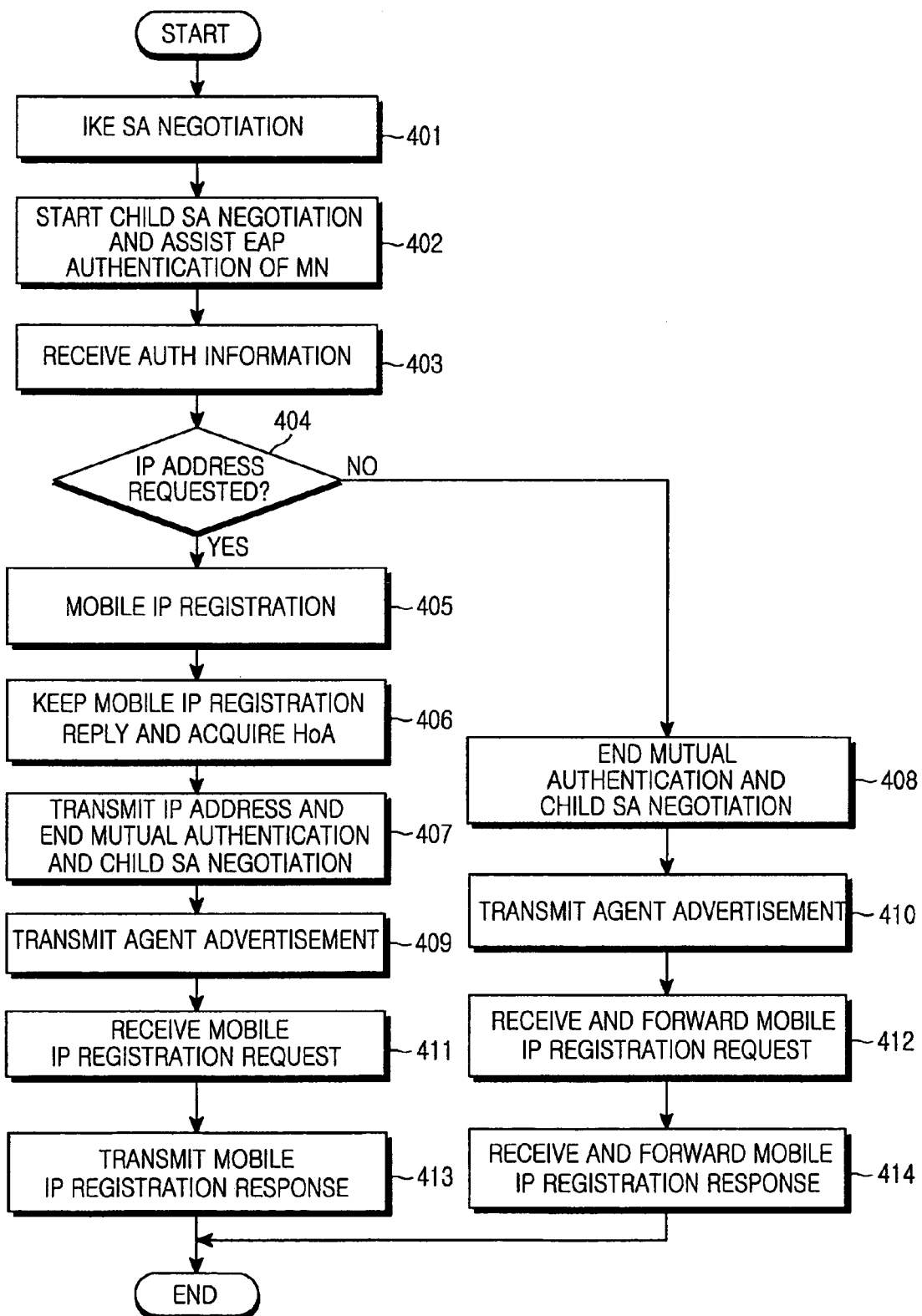
FIG. 4 is a flowchart illustrating the operation of a VPN GW serving as an MN proxy and an FA according to an exemplary embodiment of the present invention.

FIG. 4 is a flowchart illustrating the operation of the VPN GW according to an exemplary embodiment of the present invention.

Referring to FIG. 4, the VPN GW negotiates an IKE SA with the MN by receiving an IKE_SA_INIT request message from the MN and transmitting IKE_SA_INIT response message to the MN in step 401. Upon receipt of an IKE_AUTH request message without AUTH payload from the MN, the VPN GW assists the AAA server to EAP-authenticate the MN, acting as a front end authenticator of the AAA server in step 402. If the authentication is successful, the VPN GW receives an MSK resulting from the EAP authentication from the AAA server and completes preparation for mutual authentication with the MN.

In step 403, the VPN GW receives AUTH information from the MN and authenticates the MN using the AUTH information. The VPN GW determines whether the MN has requested allocation of an IP address as a HoA in step 404. The determination is made by checking whether the IKE_AUTH request message received from the MN includes CP payload. If the MN has requested allocation of an IP address, the VPN GW performs a Mobile IP registration on behalf of the MN in order to terminate a Child SA negotiation and provide an IP address to the MN in step 405. Thus, the VPN GW transmits a Mobile IP Registration request message to the HA through the AAA server. The Mobile IP Registration request message includes a NAI extension, a Mobile-Home Key Generation Nonce Request extension, and a Mobile-AAA Authentication extension. The NAI of the MN set in the NAI extension is the IDi of the IKE_AUTH request message. The Mobile-AAA Authentication extension is created using the MSK received form the AAA server and a known SPI.

Upon receipt of a Mobile IP Registration reply message from the HA, the VPN GW reads a HoA allocated for the MN by the HA and preserves the HoA for a predetermined period of time in step 406. In step 407, the VPN GW completes the mutual authentication by transmitting AUTH payload to the MN. In an exemplary implementation, the VPN GW includes Child SA information and the HoA of the MN in an IKE_AUTH response message. Thus, the VPN GW provides the HoA to the MN and terminates the Child SA negotiation.

To prompt the MN to perform a Mobile IP registration, the VPN GW transmits an Agent advertisement message to the MN and awaits reception of a Mobile IP registration request message from the MN in step 409. Upon receipt of the Mobile IP registration request message from the MN in step 411, the VPN GW transmits the preserved the Mobile IP registration reply message to the MN in step 413. Thus, the MN is now able to communicate within the VPN, with its mobility supported. Communications are then conducted between the MN and a CN using the HoA through the VPN GW.

If the MN has not requested an IP address in step 404, the VPN GW mutually authenticates the MN and terminates the Child SA negotiation by exchanging the IKE_AUTH request message and the IKE_AUTH response message with the MN in step 408. To prompt the MN to perform a Mobile IP registration, the VPN GW transmits the Agent advertisement message to the MN in step 410. Upon receipt of the Mobile IP registration request message from the MN, the VPN GW forwards the received message to the HA in step 412. The VPN GW receives a Mobile IP registration reply message from the HA and forwards it to the MN in step 414. Thus, the MN is now able to communicate within the VPN, with its mobility supported. The VPN GW then relays communications between the MN and a CN using the HoA.

In accordance with an exemplary embodiment of the present invention, after authenticating the MN, the AAA server creates an AAA SA with the MN, or updates an existing AAA SA using an MSK generated during the authentication. This AAA server operation will be described with reference to FIG. 5.

Figure 5:
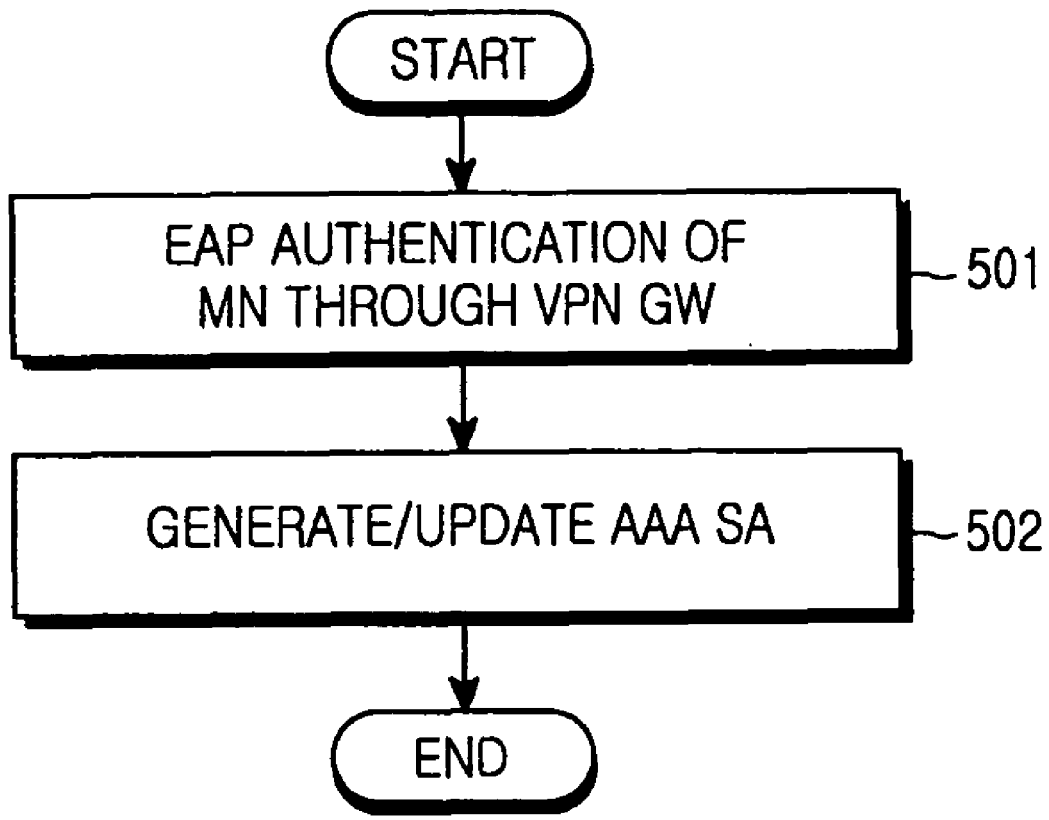
FIG. 5 is a flowchart illustrating the operation of an AAA server according to an exemplary embodiment of the present invention.

Referring to FIG. 5, the AAA server EAP-authenticates the MN in step 501. If the authentication is successful, the AAA server gets an MSK shared with the MN. In step 502, the AAA server creates an AAA SA with the MN or updates an existing AAA SA using the MSK.

Another exemplary embodiment of the present invention described below may further reduce control overhead from the use of Mobile IP in the VPN. In this exemplary embodiment, the mobility of the MN can be supported even though the MN does not perform a Mobile IP registration. The MN is allocated an IP address when it initially accesses the VPN in the intranet or through the VPN GW. Despite roaming in the VPN, the MN can communicate within the VPN using the IP address. Mobile IP regulates that the HA of the MN shall update the Mobility Binding of the MN by Mobile IP registration of the MN each time the MN moves. In accordance with another exemplary embodiment of the present invention, the VPN GW and the HA take charge of the Mobility Binding update.

When the MN moves to a home network in the intranet, the HA of the MN updates the Mobility Binding of the MN, while the home network authorizes access of the MN to the network. If the MN moves out to an external network, the VPN GW performs a Mobile IP registration on behalf of the MN during creating an IPsec tunnel between the MN and the VPN GW. This mobility support is available only under the condition that the MN is in the home network all the time when it stays in the intranet.

Exemplary implementation of the above-noted another exemplary embodiment of the present invention is described in the context of interworking between a $3^{rd}$ generation (3G) Radio Access Network (RAN) of Universal Mobile Telecommunication Service (UMTS) or Code Division Multiple Access 2000 (CDMA2000), and a WLAN as follows.

Figure 6:
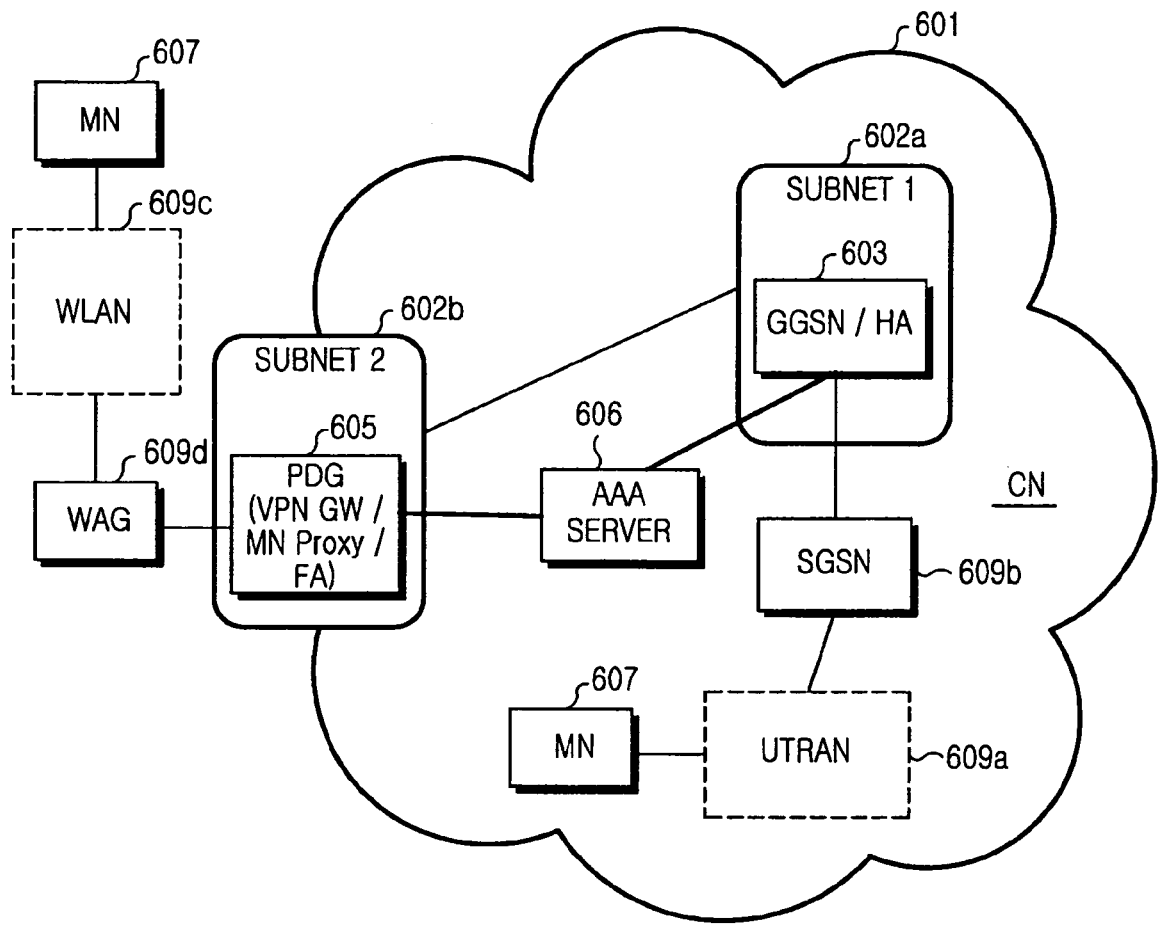
FIG. 6 illustrates a network configuration in which a 3G RAN interworks with a WLAN according to a first exemplary implementation of an embodiment of the present invention.

FIG. 6 illustrates a network configuration in which the 3G RAN interworks with the WLAN according to the exemplary implementation of the above-noted another embodiment of the present invention.

Referring to FIG. 6, a 3G CN 401 is a kind of VPN. An MN 607 accesses the CN 601 through a UMTS Terrestrial Radio Access Network (UTRAN) 609a or through a WLAN 609c.

When accessing through the UTRAN 609a, the MN 607 is connected to a Gateway General Packet Radio Service Node (GGSN) 603 through a Serving GPRS Support Node (SGSN) 609b. A subnet 602a to which the GGSN 603 belongs is a home network for the MN 607. In the subnet 602a, the GGSN 603 acts as an HA, or a separate HA can be procured.

When accessing through the WLAN 609c, the MN 607 is connected to a Packet Data Gateway (PDG) 605 through a WLAN Access Gateway (WAG) 609d. A subnet 602b to which the PDG 605 belongs is a foreign network. The PDG 605 can serve as an FA in the subnet 602b. For a connection between the MN 607 and the PDG 605, an IPsec tunnel is established between them. From the MN's point of view, accessing the CN 601 through the WLAN 609c is equivalent to accessing the VPN.

The MN 607 can change an access technique between the via-WLAN-access and the via-UTRAN-access depending on situations. The PDG 605a serving as both an MN proxy and an FA (thus, PDG/MN proxy/FA) or the GGSN 603a serving as the HA (thus, GGSN/HA) takes the task of supporting the mobility of the MN 607. Once the MN 607 accesses the CN 601 through the UTRAN 609a or through the WLAN 609c and the PDG 605, it can communicate in the CN 601 with its mobility supported. According to an exemplary implementation, there is no need for an additional Mobile IP registration procedure after the MN 607 changes an access technique for accessing the CN 601. The PDG/MN proxy/FA 605 (PDG, for short) and the GGSN/HA 603 (GGSN, for short) perform the Mobile IP registration procedure.

Figure 7:
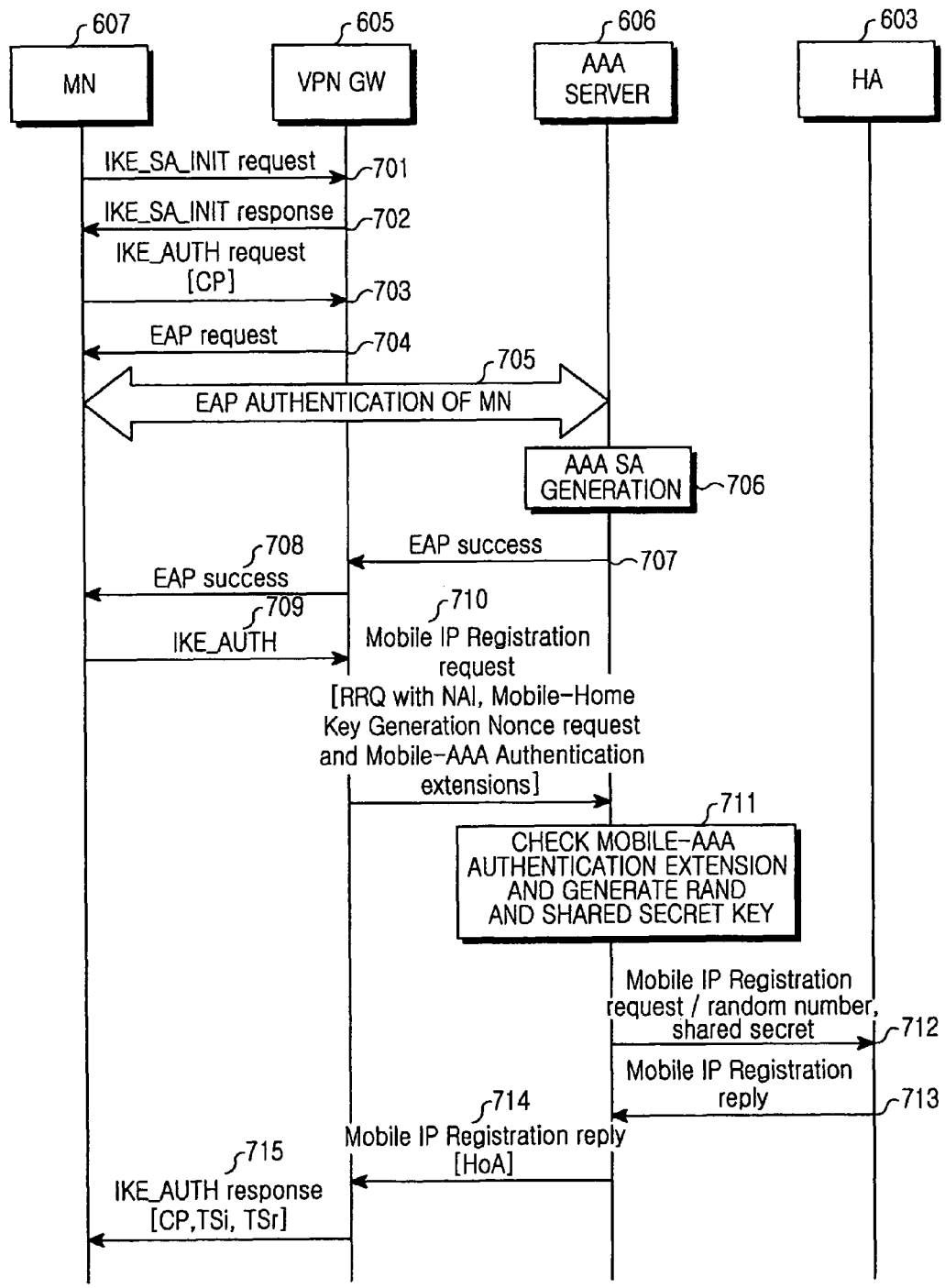
FIG. 7 is a diagram illustrating a signal flow for an MN's accessing a Core Network (CN) through the WLAN according to a second exemplary implementation of an embodiment of the present invention.

FIG. 7 is a diagram illustrating a signal flow for the MN's accessing the 3G CN through the WLAN according to an exemplary embodiment of the present invention. When the MN 607 connects to the WLAN interworking with the 3G CN and detects an appropriate PDG 605, it establishes an IPsec tunnel with the PDG 605 and attempts to access the 3G network.

Referring to FIG. 7, the MN 607 transmits an IKE_SA_INIT request message to the PDG 605 in step 701 and receives an IKE_SA_INIT response message from the PDG 605 in step 702, thereby negotiating an IKE SA with the PDG 605. In step 703, the MN 607 transmits an IKE_AUTH request message to the PDG 605. By excluding AUTH payload from the IKE_AUTH request message, the MN 607 proposes EAP mutual authentication and simultaneously starts to negotiate the first Child SA with the PDG 605. An IDi included in the IKE_AUTH request message is set to the NAI of the MN 607.

In the case where the MN 607 initially accesses the 3G CN 601, it includes CP payload set to null in the IKE_AUTH request message, thereby requesting allocation of an IP address to be used in the 3G CN 601. On the contrary, if the MN 607 was connected to the 3G CN 601 and is now at a handover, it already has an IP address and thus excluded the CP payload from the IKE_AUTH request message.

Upon receipt of the IKE_AUTH request message, the PDG 605 notifies the MN 607 of the start of EAP authentication by transmitting an EAP request message in step 704. In step 705, an AAA server 606 authenticates the MN 607 by routing of the PDG 605. If the authentication is successful, the AAA server 606 generates an AAA SA or updates an existing AAA SA using an MSK created during the authentication in step 706. In step 707, the AAA server 606 transmits an EAP success message to the PDG 605 to notify the MN 607 of the successful authentication. The PDG 605 forwards the EAP success message to the MN 607 in step 708.

In step 709, the MN 607 generates AUTH payload using the MSK and transmits an IKE_AUTH message including the AUTH payload to the PDG 605. Upon receipt of the IKE_AUTH message, the PDG 605 generates a Mobile IP Registration request message and transmits it to the AAA server 606 by an AAA protocol in order to perform a Mobile IP registration on behalf of the MN 607 in step 710.

The Mobile IP Registration request message includes a NAI extension, a Mobile-Home Key Generation Nonce request extension, and a Mobile-AAA Authentication extension. Although the Mobile-Home Key Generation Nonce request extension is used for generating an MSA shared between the MN 607 and the HA of the MN 607, the Mobile-Home MSA is not needed because the Mobile IP registration request is authenticated using the AAA SA all the time in this embodiment of the present invention. Therefore, if the MSA is not a necessity in an exemplary implementation of Mobile IP, the Mobile IP Registration request message may not have the Mobile-Home Key Generation Nonce request extension. According to an exemplary implementation, the operation for generating the MSA in the AAA server 606 and the GGSN 603 is not required.

In the Mobile IP Registration request message, a CoA is set to the IP address of the PDG 605. If the MN 607 has requested allocation of an IP address in step 703, a HoA is set to 0.0.0.0 in the Mobile IP Registration request message so that the HoA is dynamically allocated to the MN 607 by the GGSN 603 in the Mobile IP registration. On the other hand, if the MN 607 has not requested allocation of an IP address in step 703, the HoA is set to the IP address of the MN 607 within the IPsec tunnel in the Mobile IP Registration request message. The PDG 605 has knowledge of the NAI of the MN 607 and the SPI of the AAA SA generated by the AAA server 606. Since the PDG 605 acquires the AAA-key of the AAA SA in step 705, it generates the Mobile IP Registration request message using the NAI, SPI, and the AAA-key.

Upon receipt of the Mobile IP Registration request message from the PDG 605, the AAA server 606 authenticates the Mobile IP Registration request message by checking the Mobile-AAA Authentication extension included in the message in step 711. If the authentication is successful, the AAA server 606 selects a RAND and generates a shared secret key using the RAND. In step 712, the AAA server 606 transmits to the GGSN 603 the Mobile IP Registration request message, the RAND, and the shared secret key by the AAA protocol.

The GGSN 603 generates a Mobile-Home MSA for the MN 607, and generates a Mobile IP Registration reply message. In step 713, the GGSN 603 transmits the Mobile IP Registration reply message to the AAA server 606 by the AAA protocol. If the IP Mobile Registration request messages requests dynamic allocation of a HoA for the MN 607, the GGSN 603 allocates an IP address to the MN 607 and generates the Mobile IP Registration reply message with the allocated IP address being the HoA of the MN 607. The AAA server 606 forwards the Mobile IP Registration reply message to the PDG 605 by the AAA protocol in step 714. The PDG 605 acquires the HoA of the MN 607 from the Mobile IP Registration reply message.

In step 715, the PDG 605 ends the mutual authentication and the Child SA negotiation by transmitting an IKE_AUTH response message to the MN 607. The IKE_AUTH response message includes the CP payload with the HoA, TSi, and TSr. According to an exemplary implementation, the MN 607 can communicate in the 3G CN 601 using the HoA irrespective of the access techniques.

Exemplary operations of the PDG, the GGSN and the AAA server according to an exemplary embodiment of the present invention is as follows. The MN operates in the same manner as illustrated in FIG. 3, except that the MN does not generate an AAA SA after EAP authentication and does not perform a Mobile IP Registration procedure after receiving an IKE_AUTH response message from the PDG 605.

Figure 8:
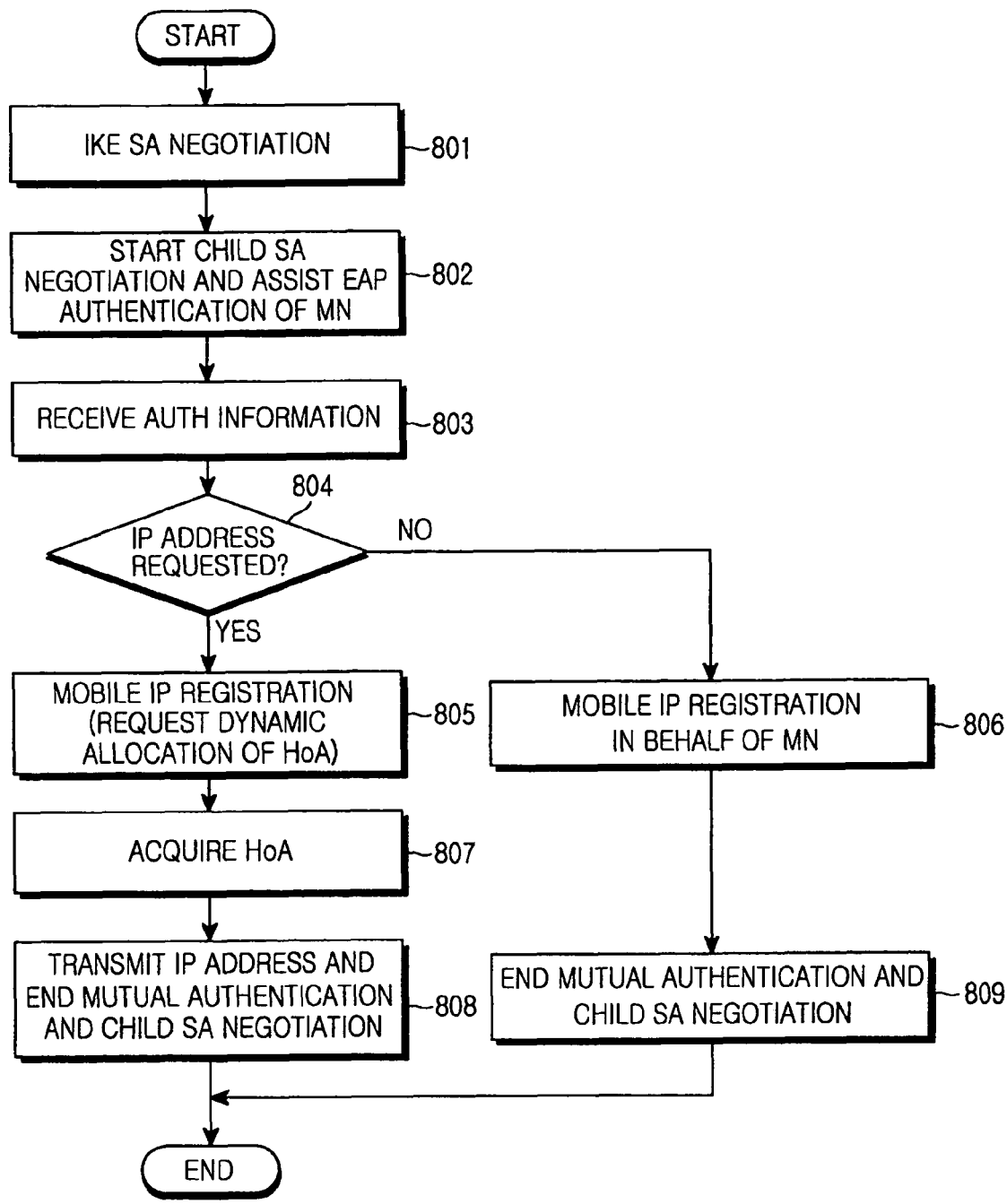
FIG. 8 is a flowchart illustrating the operation of a PDG acting as both an MN proxy and an FA according to the second exemplary implementation of an embodiment of the present invention.

FIG. 8 is a flowchart illustrating the operation of the PDG according to an exemplary implementation of an embodiment of the present invention.

Referring to FIG. 8, the PDG negotiates an IKE SA with the MN by receiving an IKE_SA_INIT request message from the MN and transmitting IKE_SA_INIT response message to the MN in step 801. Upon receipt of an IKE_AUTH request message without AUTH payload from the MN, the PDG assists the AAA server to EAP-authenticate the MN in step 802. If the authentication is successful, the PDG receives an MSK resulting from the EAP authentication from the AAA server and completes preparation for mutual authentication with the MN.

In step 803, the PDG receives AUTH information from the MN and authenticates the MN using the AUTH information. The PDG determines whether the MN has requested allocation of an IP address in step 804. The determination is made by checking whether the IKE_AUTH request message received from the MN includes CP payload. If the MN has requested allocation of an IP address, the PDG performs a Mobile IP registration on behalf of the MN in step 805. Thus, the PDG transmits a Mobile IP Registration request message to the GGSN through the AAA server. The Mobile IP Registration request message includes a NAI extension and a Mobile-AAA Authentication extension. A HoA is set to 0.0.0.0 and a CoA is set to the IP address of the PDG in the Mobile IP Registration request message.

The PDG checks the NAI of the MN from the IDi of the IKE_AUTH request message received from the MN in step 802 and generates the Mobile-AAA Authentication extension using the MSK received from the AAA server in step 802. The PDG forwards the Mobile IP Registration request message to the GGSN.

Upon receipt of a Mobile IP Registration reply message from the GGSN, the PDG reads a HoA allocated for the MN by the GGSN in step 807. In step 808, the PDG completes the mutual authentication by transmitting AUTH payload to the MN. To be more specific, the PDG includes Child SA information and the HoA of the MN in an IKE_AUTH response message. According to an exemplary implementation, the PDG provides the HoA to the MN and terminates the Child SA negotiation.

If the MN has not requested allocation of an IP address in step 804, the PDG does not need to receive the HoA of the MN dynamically allocated from the GGSN. It just performs a Mobile IP registration on behalf of the MN. Therefore, the PDG transmits a Mobile IP Registration request message on behalf of the MN in step 806. The HoA of the MN is set to the IP address of the MN used within the IPsec tunnel created in step 802 in the Mobile IP Registration request message. After the Mobile IP registration, the PDG terminates the mutual authentication and the Child SA negotiation simultaneously by exchanging an IKE_AUTH request message and an IKE_AUTH response message with the MN in step 809.

After the negotiation ends, the MN is able to communicate within the 3G CN, with its mobility supported.

Figure 9:
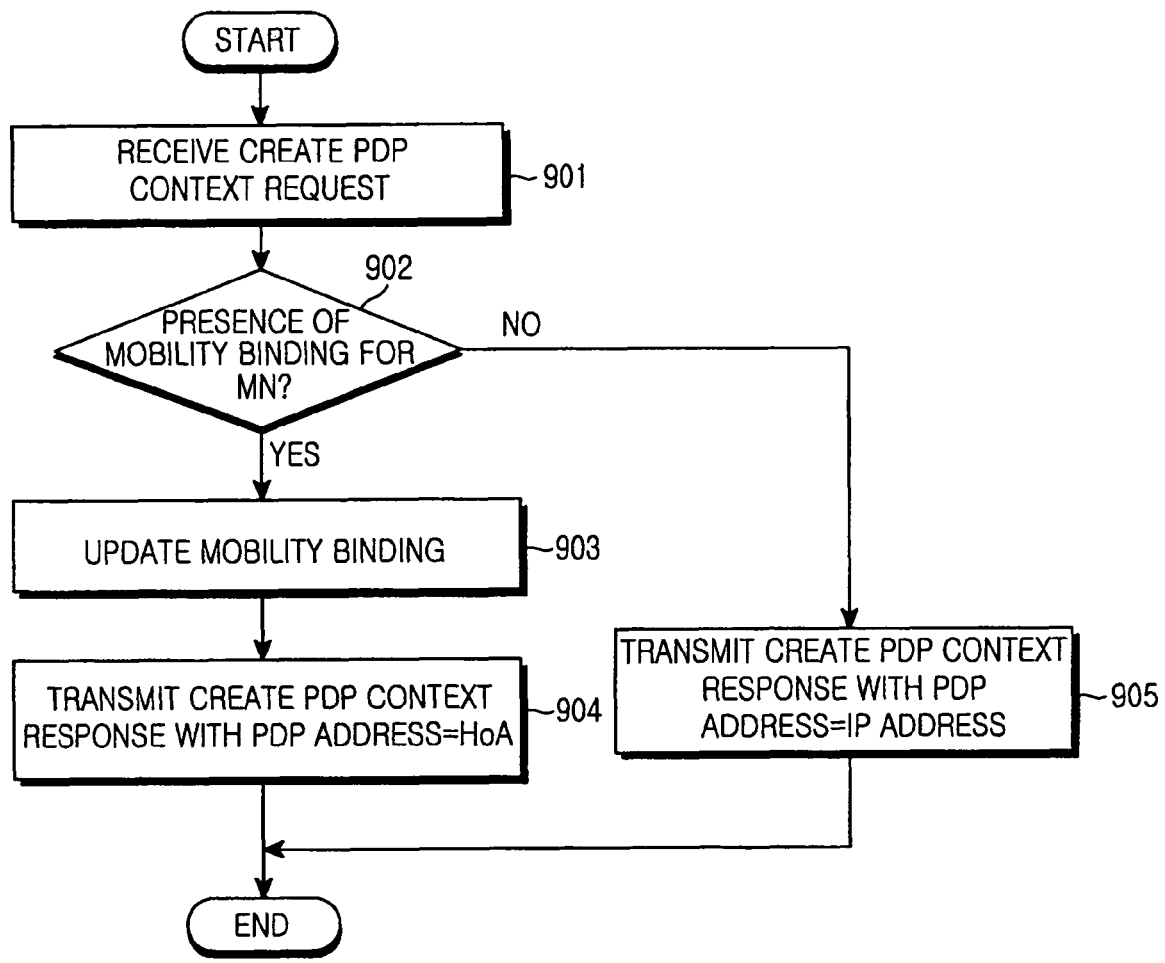
FIG. 9 is a flowchart illustrating the operation of a GGSN acting as an HA according to the second exemplary implementation of an embodiment of the present invention.

FIG. 9 is a flowchart illustrating the operation of the GGSN according to an exemplary implementation of an embodiment of the present invention. The GGSN itself amends the Mobility Binding of the MN while the MN is being authorized access to the 3G CN through the UTRAN. The Mobility Binding, which is used in Mobile IP, may include information about the mapping relationship between the HoA of the MN preserved in the HA and the CoA indicating the current position of the MN.

Referring to FIG. 9, the GGSN receives a Create PDP Context Request message for the MN from the SGSN in step 901 and determines whether a Mobility Binding already exists for the MN in step 902. In the presence of the Mobility Binding, the GGSN updates the Mobility Binding of the MN, considering that the MN has already accessed the CN and been allocated a HoA, in step 903. In step 904, the GGSN transmits to the SGSN a Create PDP Context response message with the HoA of the MN set as a PDP address.

On the other hand, in the absence of the Mobility Binding, the GGSN allocates an IP address to the MN, determining that the MN is to initially access the CN, and transmits to the SGSN a Create PDP Context response message with the IP of the MN set as a PDP address in step 905.

While not shown in FIG. 9, if the HA of the MN is different from the GGSN, the GGSN exchanges information required to update the Mobility Binding of the MN with the HA.

The AAA server operates in the same manner as illustrated in FIG. 5 and thus its description is not provided redundantly.

In accordance with the certain exemplary embodiment of the present invention as described above, the mobility of an MN can be supported using Mobile IP in a VPN, with only two IP addresses allocated to the MN, and an additional Mobile IP tunnel may not required within an IPsec tunnel between the MN and a VPN GW. Thus, packet transmission overhead is reduced. In another exemplary embodiment, the present invention may obviate the need for other operations for mobility support except for ion to the VPN in the MN. Therefore, the access procedure and protocol stack of can be simplified.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of allocating a home of address (HoA) to a mobile node (MN) in a virtual private network (VPN), the method comprising the steps of:
    transmitting to a gateway of the VPN an authentication request message requesting allocation of a HoA by the MN;
    performing, at the gateway, a mobile internet protocol (IP) registration on behalf of the MN during creation of an IPsec tunnel;
    acquiring, at the gateway, the HoA allocated from a home agent (HA);
    transmitting an authentication response message comprising the allocated HoA to the MN by the gateway; and
    communicating with a correspondent node (CN) using the HoA through the gateway by the MN.

2. The method of claim 1, wherein the authentication request message comprises configuration payload (CP) for proposing mutual authentication and requesting a security association (SA) negotiation to the gateway.

3. The method of claim 2, wherein the CP is set to null in order to request the SA negotiation to the gateway.

4. The method of claim 2, wherein the authentication request message further comprises a network access identifier (NAI) of the MN.

5. The method of claim 1, wherein the step of performing the mobile IP registration comprises the steps of:
    collecting a shared secret key between the MN and an Authentication, Authorization and Accounting (AAA) server by the gateway;
    transmitting an IP registration request message comprising an authentication extension to the AAA server by the gateway, the authentication extension being created using the shared secret key and a security parameter index (SPI) used to identify the AAA SA;
    authenticating the mobile IP registration request message by the AAA server and transmitting the mobile IP registration request message to the HA by the AAA server;
    transmitting a mobile IP registration response message comprising the HoA allocated to the MN, to the AAA server by the HA; and
    transmitting the mobile IP registration response message to the gateway by the AAA server.

6. The method of claim 5, wherein the shared secret key comprises a master session key (MSKI) generated according to an extensible authentication protocol (EAP).

7. The method of claim 5, wherein the SPI comprises a value known to the gateway.

8. The method of claim 5, wherein the mobile IP registration request message comprises the NAI of the MN.

9. The method of claim 5, wherein the mobile IP registration request message comprises a request for generation of a mobility security association (MSA) between the MN and the HA.

10. The method of claim 5, further comprising the steps of:
    receiving an agent advertisement message from the gateway and transmitting the mobile IP registration request message to the gateway by the MN; and
    transmitting the mobile IP registration response message received from the AAA server and preserved to the MN by the gateway.

11. The method of claim 1, further comprising the step of generating an AAA SA by authenticating the MN through the gateway by an AAA server.

12. The method of claim 1, wherein the gateway acts as a foreign agent (FA) in the VPN.

13. The method of claim 12, wherein the gateway comprises a VPN gateway for connecting the MN to the VPN when the MN is located in an external network.

14. The method of claim 1, wherein the VPN comprises a core network (CN) interworking with at least one of a radio access network and a wireless local area network (WLAN) accessed by the MN.

15. The method of claim 14, wherein the gateway comprises a packet data gateway (PDG) for serving as the FA and connecting the MN to the CN when the MN is located in the radio access network or the WLAN.

16. The method of claim 15, wherein the HA comprises a gateway node for managing the MN and connecting to the radio access network through a service node which serves the MN, when the MN is located in the radio access network.

17. An apparatus for allocating a home of address (HoA) to a mobile node (MN) in a virtual private network (VPN), the apparatus comprising:
    a home agent (HA) and a foreign agent (FA) located in the VPN; and
    a gateway for receiving an authentication request message requesting allocation of a HoA for use in the VPN from the MN, and performing a mobile internet protocol (IP) registration on behalf of the MN during creation of an IPsec tunnel;
    wherein the gateway acquires the HoA allocated from the HA, and transmits an authentication response message comprising the allocated HoA to the MN;
    whereby the MN communicates with a correspondent node (CN) using the HoA.

18. The apparatus of claim 17, wherein the authentication request message comprises configuration (CP) payload for proposing mutual authentication and requesting a security association (SA) negotiation to the gateway.

19. The apparatus of claim 18, wherein the CP is set to null in order to request the SA negotiation to the gateway.

20. The apparatus of claim 17, wherein the authentication request message further comprises a network access identifier (NAI) of the MN.

21. The apparatus of claim 17, wherein after initially accessing the gateway, the MN determines whether the MN has a HoA used in the VPN, and in the presence of the HoA, the MN transmits the authentication request message.

22. The apparatus of claim 17, wherein the MN is authenticated by an authentication, authorization and accounting (AAA) server through the gateway, and generates or updates an AAA security association (SA) using a shared secret key between the MN and the AAA server.

23. The apparatus of claim 17, wherein the gateway assists the authentication of the MN in the AAA server, collects the shared secret key between the MN and the AAA server, transmits an IP registration request message including an authentication extension to the AAA server, the authentication extension being created using the shared secret key and a security parameter index (SPI) used to identify the AAA SA, and receiving a mobile IP registration response message comprising the HoA allocated for the MN from the AAA server.

24. The apparatus of claim 23, wherein the shared secret key comprises a master session key (MSKI) generated according to an extensible authentication protocol (EAP).

25. The apparatus of claim 23, wherein the SPI comprises a value known to the gateway.

26. The apparatus of claim 23, wherein the mobile IP registration request message comprises the NAI of the MN.

27. The apparatus of claim 23, wherein the mobile IP registration request message requests generation of a mobility security association (MSA) between the MN and the HA.

28. The apparatus of claim 23, wherein after transmitting the authentication response message, the gateway transmits an agent advertisement message to the MN in order to prompt the MN to perform a mobile IP registration, and upon receipt of a mobile IP registration request message from the MN, transmitting the mobile IP registration response message received from the AAA server to the MN.

29. The apparatus of claim 17, wherein the gateway acts as a foreign agent (FA) in the VPN.

30. The apparatus of claim 29, wherein the gateway comprises a VPN gateway for connecting the MN to the VPN when the MN is located in an external network.

31. The apparatus of claim 17, wherein the VPN comprises a core network (CN) interworking with at least one of a radio access network and a wireless local area network (WLAN) accessed by the MN.

32. The apparatus of claim 31, wherein the gateway comprises a packet data gateway (PDG) for serving as the FA and connecting the MN to the CN when the MN is located in the radio access network or the WLAN.

33. The apparatus of claim 32, wherein the HA comprises a gateway node for managing the MN and connecting to the radio access network through a service node which serves the MN, when the MN is located in the radio access network.

34. A method of allocating a home of address (HoA) in a mobile node (MN) in a virtual private network (VPN), the method comprising the steps of:
   transmitting to a gateway of the VPN an authentication request message requesting allocation of a HoA;
   performing, at the gateway, a mobile internet protocol (IP) registration on behalf of the MN during creation of an IPsec tunnel;
   receiving from the gateway an authentication response message comprising a HoA allocated for the MN by a home agent (HA) which manages the MN; and
   communicating with a correspondent node (CN) using the HoA through the gateway.

35. The method of claim 34, wherein the authentication request message comprises configuration (CP) payload set to null in order to propose mutual authentication and request a security association (SA) negotiation to the gateway.

36. The method of claim 35, wherein the authentication request message further comprises a network access identifier (NAI) of the MN.

37. The method of claim 34, wherein the gateway serves as a foreign agent (FA) in the VPN.

38. The method of claim 37, wherein the gateway comprises a VPN gateway for connecting the MN to the VPN when the MN is located in an external network.

39. The method of claim 34, wherein the VPN comprises a core network (CN) interworking with at least one of a radio access network and a wireless local area network (WLAN) accessed by the MN.

40. The method of claim 39, wherein the gateway comprises a packet data gateway (PDG) for serving as the FA and connecting the MN to the CN when the MN is located in the radio access network or the WLAN.

41. The method of claim 40, wherein the HA comprises a gateway node for managing the MN and connecting to the radio access network through a service node which serves the MN, when the MN is located in the radio access network.

42. A method of allocating a home of address (HoA) for a mobile node (MN) in a gateway of a virtual private network (VPN), the method comprising the steps of:
   receiving from the MN an authentication request message requesting allocation of a HoA;
   performing, at the gateway, a mobile internet protocol (IP) registration on behalf of the MN during creation of an IPsec tunnel;
   acquiring, at the gateway, the HoA for use in the VPN from a home agent (HA);
   transmitting an authentication response message comprising the allocated HoA to the MN; and
   relaying communications between the MN and a correspondent node (CN) using the HoA.

43. The method of claim 42, wherein the authentication request message comprises configuration (CP) payload for proposing mutual authentication and requesting a security association (SA) negotiation to the gateway.

44. The method of claim 43, wherein the CP is set to null in order to request the SA negotiation to the gateway.

45. The method of claim 43, wherein the authentication request message further comprises a network access identifier (NAI) of the MN.

46. The method of claim 42, wherein the step of performing the mobile IP registration comprises the steps of:
   collecting a shared secret key between the MN and an Authentication, Authorization and Accounting (AAA) server;
   transmitting an IP registration request message comprising an authentication extension to the AAA server, the authentication extension being created using the shared secret key and a security parameter index (SPI) used to identify the AAA SA; and
   receiving a mobile IP registration response message comprising the HoA allocated by the HA to the MN from the AAA server.

47. The method of claim 46, wherein the shared secret key comprises a master session key (MSKI) generated according to an extensible authentication protocol (EAP).

48. The method of claim 46, wherein the SPI comprises a value known to the gateway.

49. The method of claim 46, wherein the mobile IP registration request message comprises the NAI of the MN.

50. The method of claim 46, wherein the mobile IP registration request message comprises a request for generation of a mobility security association (MSA) between the MN and the HA.

51. The method of claim 46, further comprising the steps of:
   transmitting an agent advertisement message to the MN and receiving a mobile IP registration request message from the MN; and
   transmitting the mobile IP registration response message received from the AAA server and preserved to the MN.

52. The method of claim 42, further comprising the step of generating an AAA SA by authenticating the MN through the gateway by an AAA server.

53. The method of claim 42, wherein the gateway acts as a foreign agent (FA) in the VPN.

54. The method of claim 53, wherein the gateway comprises a VPN gateway for connecting the MN to the VPN when the MN is located in an external network.

55. The method of claim 42, wherein the VPN comprises a core network (CN) interworking with at least one of a radio access network and a wireless local area network (WLAN) accessed by the MN.

56. The method of claim 55, wherein the gateway comprises a packet data gateway (PDG) for serving as the FA and connecting the MN to the CN when the MN is located in the radio access network or the WLAN.

57. The method of claim 56, wherein the HA comprises a gateway node for managing the MN and connecting to the radio access network through a service node which serves the MN, when the MN is located in the radio access network.

* * * * *